(12) United States Patent
Johnson

(10) Patent No.: US 9,065,564 B2
(45) Date of Patent: Jun. 23, 2015

(54) WORLD-WIDE, WIDE-BAND, LOW-LATENCY, MOBILE INTERNET AND SYSTEM THEREFOR

(71) Applicant: William M. Johnson, Sudbury, MA (US)

(72) Inventor: William M. Johnson, Sudbury, MA (US)

(73) Assignees: Kara Whitney Johnson, San Francisco, CA (US); Brett Harper Johnson, New York, NY (US)

( * ) Notice: Subject to any disclaimer, the term of this patent is extended or adjusted under 35 U.S.C. 154(b) by 128 days.

(21) Appl. No.: 13/573,794

(22) Filed: Oct. 3, 2012

(65) Prior Publication Data
US 2013/0101293 A1    Apr. 25, 2013

Related U.S. Application Data

(60) Provisional application No. 61/542,466, filed on Oct. 3, 2011.

(51) Int. Cl.
*H04B 10/00* (2013.01)
*H04B 10/118* (2013.01)

(52) U.S. Cl.
CPC .................................. *H04B 10/118* (2013.01)

(58) Field of Classification Search
CPC ................ H04B 10/11; H04B 10/118; H04B 10/25752; H04B 10/25753; H04Q 2213/333; H04Q 2213/13333

USPC .................. 398/118, 121, 124, 125, 128, 130
See application file for complete search history.

(56) References Cited

U.S. PATENT DOCUMENTS

| | | | | |
|---|---|---|---|---|
| 6,031,576 | A * | 2/2000 | Kuykendall, Jr. | 375/240.26 |
| 6,078,810 | A * | 6/2000 | Olds et al. | 455/428 |
| 6,097,952 | A * | 8/2000 | Kawabata | 455/435.1 |
| 6,246,501 | B1 * | 6/2001 | Dreischer et al. | 398/122 |
| 7,739,003 | B2 * | 6/2010 | Johnson | 701/4 |
| 2002/0132578 | A1 * | 9/2002 | Wiedeman | 455/12.1 |
| 2004/0001720 | A1 * | 1/2004 | Krill et al. | 398/125 |
| 2008/0002981 | A1 * | 1/2008 | Valley et al. | 398/121 |

* cited by examiner

*Primary Examiner* — Dalzid Singh
(74) *Attorney, Agent, or Firm* — Preti Flaherty Beliveau & Pachios LLP

(57) ABSTRACT

A communication system for providing world-wide, mobile Internet communication to a plurality of users and a method therefore. The system includes ground-based, multi-channel, radio frequency transmitting and receiving broadcasting grids that are capable of providing content to multiple users via cell towers and low-altitude, optical transmitting and receiving satellites that are in optical communication with the ground-based, multi-channel, RF transmitting and receiving broadcasting grids. The method includes transmitting optical and/or RF signals between at least one of the ground-based, multi-channel, RF transmitting and receiving broadcasting grids and at least one of the low-altitude, optical transmitting and receiving satellites.

20 Claims, 2 Drawing Sheets

WORLD-WIDE, WIDE-BAND, LOW-LATENCY, MOBILE INTERNET AND SYSTEM THEREFOR

CROSS REFERENCE TO RELATED APPLICATIONS

This application claims priority of Provisional Application No. 61/542,466 filed Oct. 3, 2011

STATEMENT REGARDING FEDERALLY SPONSORED RESEARCH OR DEVELOPMENT (Not applicable)

BACKGROUND OF THE INVENTION

Internet communication via satellite is know using High earth orbit geostationary satellites. These are expensive and very power hungry systems, hard to place and stabilize in orbit and have a wide channel dimension for the RF communication they use.

SUMMARY OF THE INVENTION

A communication system for providing world-wide, mobile Internet communication to a plurality of users and a method therefore is disclosed. The system includes ground-based, multi-channel, radio frequency (RF) transmitting and receiving broadcasting grids that are capable of providing content to multiple users via cell towers and low-altitude, optical transmitting and receiving satellites that are in optical communication at the teleport interface with the ground-based, multi-channel, radio frequency (RF) transmitting and receiving broadcasting grids. The method includes transmitting optical and/or RF signals between at least one of the ground-based, multi-channel, RF transmitting and receiving broadcasting grids and at least one of the low-altitude, optical transmitting and receiving satellites.

BRIEF DESCRIPTION OF THE DRAWINGS

The invention is pointed out with particularity in the appended claims. However, the advantages of the invention described above, together with further advantages, may be better understood by referring to the following description taken in conjunction with the accompanying drawings. The drawings are not necessarily drawn to scale, and like reference numerals refer to the same parts throughout the different views.

DETAILED DESCRIPTION OF THE INVENTION

A satellite and a satellite system for performing optical transmitting and receiving communication functions are known to the art. For example, U.S. Patent No. 7,739,003 to Johnson is incorporated in its entirety herein. Furthermore, a method and system for over-the-air broadcast of high-definition television (HDTV) are also well-known. For example, U.S. Pat. No. 6,031,576 to Kuykendall is incorporated in its entirety herein.

Combining the teachings and capabilities of the Johnson and Kuykendall patents produces a low-cost, low-latency, optical and/or RF transmitting/receiving system having particular advantages over the prior art.

Figure 1:
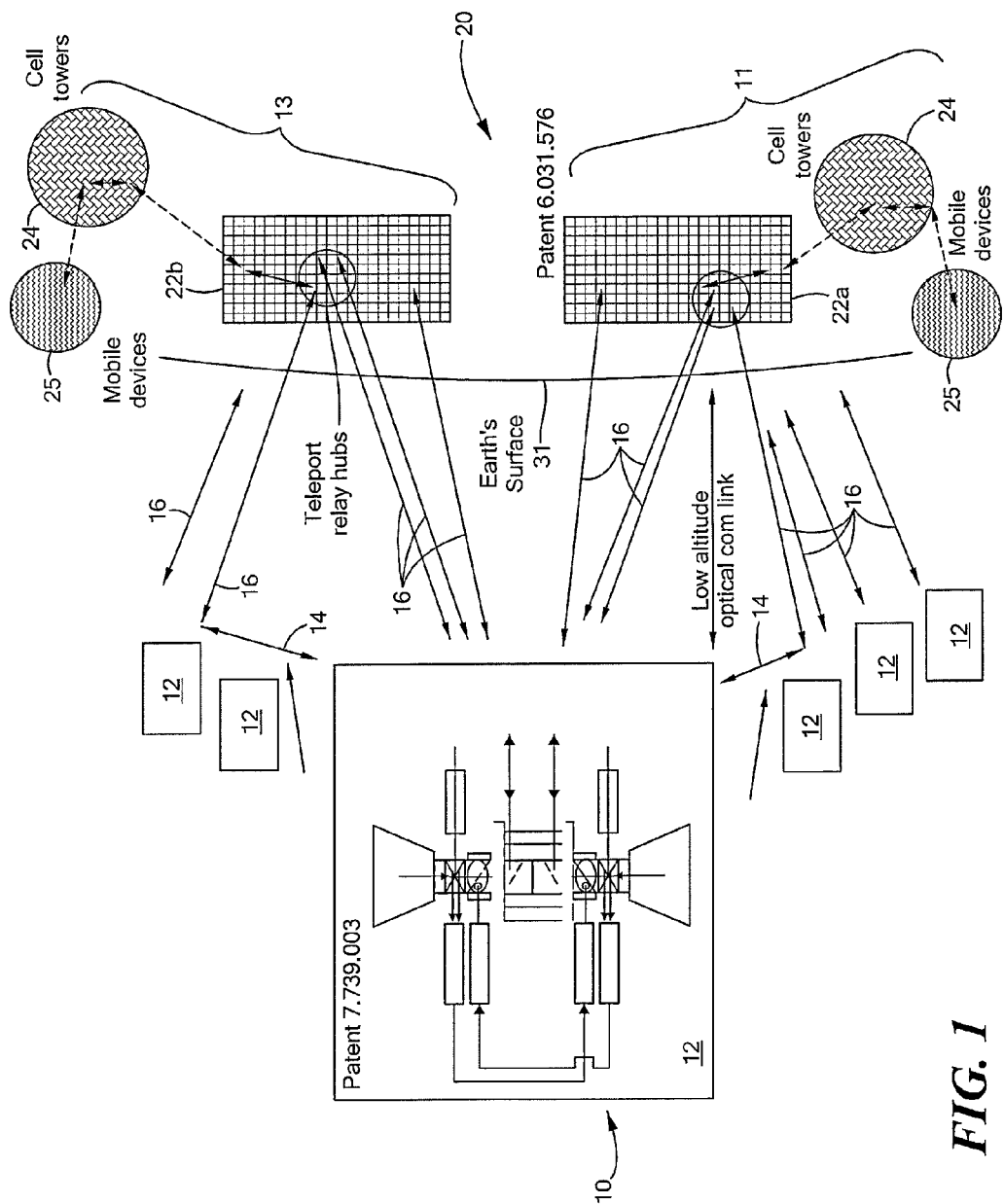
FIG. 1 is an illustration of a wide-band, low-latency system in accordance with the present invention.

In the present invention there is shown means for providing world-wide, wide-bandwidth, low-latency mobile Internet connection from USA to Europe via low-cost, low-altitude satellite. FIG. 1 is an example thereof.

Referring to FIG. 1, an optical satellite system transmitting and receiving system 10 and a ground-based RF transmitting and receiving system 20 are shown. The optical satellite system transmitting and receiving system 10 and the ground-based RF transmitting and receiving system 20 are in optical communication 16. As a result, up-links and down-links travel through the atmosphere between the two systems 10 and 20. Bore-sighting a relatively high-power laser at the ground-based RF transmitting and receiving system 20 to a relatively low-power laser at the optical satellite transmitting and receiving system 10 can mitigate deleterious atmospheric effects, e.g., absorption, turbulence, blooming, and so forth.

The optical satellite system transmitting and receiving system 10 includes a and is incorporated in a plurality of low-cost, low-altitude, spin stabilized satellites 12 that can be deployed to provide an intra-satellite link 14 and communication linkage 16 to the users in the United States 11, to users in Europe 13, and so forth. Advantageously, the optical satellite system transmitting and receiving system 10 can propagate optical signals in a vacuum and with minimal atmospheric deterioration between satellites 12. As a result, the satellites 12 can be used as optical signal routers in an optical space Internet system. Advantageously, optical satellites 12 can simultaneously rout optical signals 14 to other satellites and/or optical signals 16 to the ground-based RF transmitting and receiving system 20 without reliance on telephone lines, coaxial cables, fiber-optical cables, and the like. This allows communication over significant earth distances. More advantageous, is that bad weather that might otherwise cause problems with up-links and/or down-links can be avoided by using communication links that are not affected by the bad weather.

By deploying the satellites 12 in a low altitude orbit, a low latency connection is possible. Low latency is advantageous because, inter alia, "handshaking" and "page-sending" operations on mobile devices 25 are quick and convenient.

The ground-based RF transmitting and receiving system 20 includes a plurality of broadcasting grids 22a, 22b that are in communication with a multiplicity of mobile devices 25, e.g., cellular phones, smart phones, personal computers, laptop computers, and the like, via dedicated cell towers 24 on the earth's surface 31. Broadcasting between units 22a, 22b, 24 and 25 as shown is two way grids for the United States 22a and Europe 22b are shown in FIG. 1 for illustrative purposes only. Any number of broadcasting grids 22 in any number of global markets can be serviced by the system. 22b shows an Upgraded Broadcasting grid of N Multi-channel transmitter tower sites in Europe by example and 22a shows an Upgraded Broadcasting grid of 200 multi-channel transmitter tower sites in the USA.

As described in Kuykendall, the broadcasting grids 22a, 22b of the ground-based RF transmitting and receiving system 20 include a number, e.g., 200, of multi-channel transmitters that can operate on a broad-band to provide, for example, home HDTV service, mobile cell TV service, and so forth on a one way basis. Communication to the mobile devices 25 via cell towers 24 is well-known to the art. The broadcasting grids 22a, 22b may include fiber-optic links that are adapted to inter-connect RF transmitters and RF cell towers 24, especially in urban areas. In more rural areas, RF links are used in lieu of fiber-optic links.

The interface between the optical, space-based portion 10 and the RF, ground-based portion 20 of the system occurs at a teleport relay hub. The teleport relay hub includes an optical transmitter/receiver for transmitting and receiving optical signals with the space-based portion 10 and a conversion device for converting a received optical signal to an RF signal and/or for converting a received RF signal to an optical signal.

Proliferated constellations of low-altitude, low latency low-latency optical satellites are shown in units 12 in FIG. 1 providing Internet connection between Europe and the USA.

FIG. 1 as thus described provides an Optical Satellite System Transmitting/Receiving to 200 Ground-based Optical Transmitter/Receiving sites CO-located with 200 Multi-channel Transmitter Sites that can provide home TV service and mobile cell TV user service. The indicated cell phone tower network near each of the 200 tower sites is already in place. This basic concept can be upgraded to a high bandwidth internet system (shown by the double-headed arrows) that enable smart phones, laptops, etc to handshake and transmit/receive wide bandwidth data with a low-latency, lower cost, connection capability. (the optical satellite link system is preferred to an optional RF satellite link system at a higher altitude with less carrier bandwidth and more latency). "The world-wide, wide-bandwidth, internet Low Earth Orbit (LEO) system described in provides the shortest possible latency between any two world-wide points via free space laser optical links to a local ground segment (RF or fiber-optic). The shortest latency provides the best internet user experience in terms of burst data error correction and other internet handshaking protocols."

The spinning satellite space-segment communication system described above is further provided with, in the constellation of small, low-earth-orbit (LEO), spin-stabilized satellites 12, the means that provide for inertial spin stabilization, attitude determination, magnetic-loop control using techniques as are known in the art. On the same basis the system further includes means for providing satellite guidance, navigation and control in earth coordinates, with counter-rotating, inertial-stabilized pointing/tracking, bore-sighted downlinks/uplinks, and compensation for atmospheric turbulence effects. The system as noted above provides very low latency, wide optical bandwidths along with optical routing around satellite constellations and optical atmospheric turbulence compensation as is know in the art. The LEO free space optical system thus described has an optimal internet capability.

Figure 2:
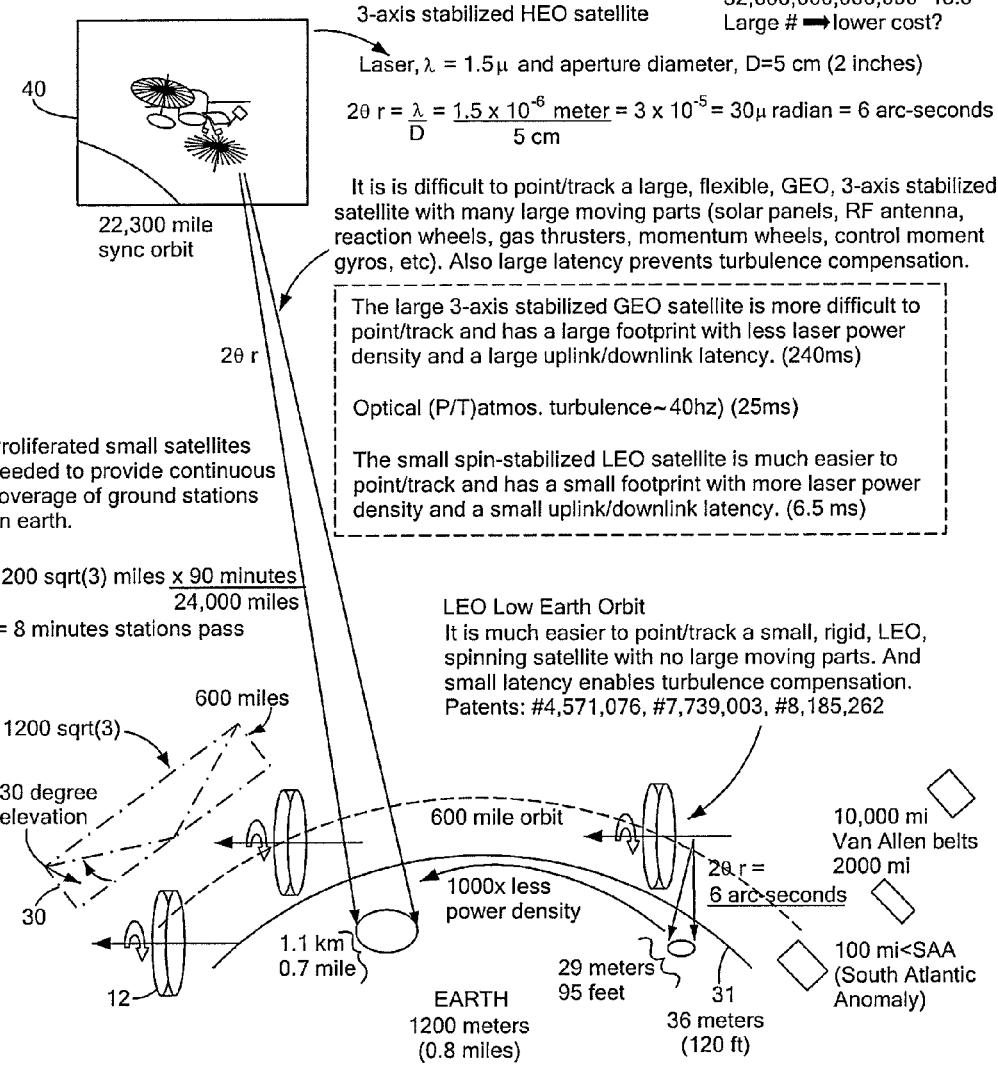
FIG. 2 illustrates the benefits and advantages of the present inventions LEO, low earth orbit, spinner satellite Internet communication system against the conventional GEO, geostationary earth orbit, RF based Internet communication systems.

In this respect, FIG. 2 illustrates the benefits and advantages of the present inventions LEO, low earth orbit, spinner satellite Internet communication system against the conventional GEO, geostationary earth orbit, RF based satellite Internet communication system. The Satellite(s) 40 of the GEO approach satellite 40 must be a 3-axis stabilized HEO, high earth orbit, satellite at an altitude in the area of 22,300 miles to provide a stationary synced orbit.

For the LEO satellite a Laser, $\lambda=1.5\mu$ and aperture diameter, D, =5 cm (2 inches) is possible with $2\Theta r=\lambda=1.5\times10^{-6}$ meter=$3\times10^{-5}$=$30\mu$ radian=6 arc-seconds providing a small, interference avoiding, channel size. In the environment of FIG. 2, $2\Theta=\lambda/D$, diameter.

For the GEO, high earth orbit satellites (HEO) 40 the following apply: 3-axis stabilized HEO satellite is used.

Laser, $\lambda=1.5\mu$ and aperture diameter, D=5 cm (2 inches)
$2\Theta r=\lambda 1.5\times10^{-6}$ meter=$3\times10^{-5}$=$30\mu$ radian=6 arc-seconds
D=5 cm $\lambda$=wavelength D=diameter $2\Theta$=the double angle describing the diameter of the circular spot Moreover, it is difficult to point and/or track a large, flexible, GEO, 3-axis stabilized satellite with many large moving parts (solar panels, RF antenna, reaction wheels, gas thrusters. Momentum wheels, control moment gyros, etc.). Also high latency prevents turbulence compensation. Table I presents a summary of the benefits to LEO spinners.

TABLE I

Order of Magnitude (OOM) HEO RF vs. LEO Optical Advantages

| | OOM |
|---|---|
| Weight | 2.0 |
| Bandwidth | 2.0 |
| Point/track accuracy | 1.0 |
| Power density (gnd) | 3.0 |
| Latency | 1.5 |
| Atmos. correction | 1.0 |
| Test & Operations | 2.0 |
| Avoid FCC licensing | 1.0 |

$32 \times 10^{12} = 13.5$

Large # yields lower cost likely

Proliferated small satellites are needed to provide continuous coverage of ground stations on earth as the satellites pass the earth positions. Area 30 in FIG. 2 *illustrates* a coverage pattern representing an 8 minute teleport contact time during a satellite overpass at 600 miles. Coverage calculated as 1200 sqrt(3) miles×90 minutes coverage per satellite means over 24,000 miles an 8 minute station pass. For a 90 minute orbit, 90min/8min implies 12 or more proliferated satellites in an equatorial orbit would provide continuous contact to a ground=based teleport near equator. It is much easier to point/track a small, rigid, LEO, spinning satellite with no large moving parts. And small latency enables turbulence compensation. Details in the art are in U.S. Pat. Nos. 4,571,076, 7,739,003, 8,185,262, incorporated herein by reference Although the invention is described through the above-described exemplary embodiments, it will be understood by those of ordinary skill in the art that modifications to, and variations of, the illustrated embodiments may be made without departing from the inventive concepts disclosed herein. Accordingly, the invention should not be viewed as limited, except by the scope and spirit of the appended claims.

What is claimed is:

1. A communication system for providing world-wide, mobile Internet communication to a plurality of users, the system comprising:
    a plurality of ground-based, multi-channel, radio frequency or optical transmitting and receiving broadcasting grids that are capable of providing multichannel radio frequency transmitting to the plurality of users via at least one cell tower; and
    a plurality of low-altitude, optical transmitting and receiving satellites that are in optical communication with the plurality of ground-based, multi-channel, radio frequency or optical transmitting and receiving broadcasting grids,
    wherein said satellites are spinning stabilized.

2. The communication system of claim 1 wherein said satellites are approximately 600 miles above the earth.

3. The communication system of claim 1 wherein said satellites transit an earth based grid in approximately 8 minutes.

4. The communication system of claim 1 wherein each satellite communicates with another satellite to provide communication between users over significant earth distances.

5. The communication system of claim 1 wherein communication between users is achieved using plural grids and plural satellites.

6. The communication system of claim 1 wherein said satellites are rigid satellites.

7. The communication system of claim 1 wherein said satellites have no large moving parts.

8. The communication system of claim 1 wherein said communication system is configured to mitigate atmospheric absorption and blooming.

9. A method of providing world-wide, mobile Internet communication to a plurality of users, the method comprising:
- providing a plurality of ground-based, multi-channel, optical or radio frequency transmitting and receiving broadcasting grids that are capable of providing content to the plurality of users via at least one cell tower;
- providing a plurality of low-altitude, optical transmitting and receiving satellites that are in optical communication with the plurality of ground-based, multi-channel, optical or radio frequency transmitting and receiving broadcasting grids;
- spin stabilizing said satellites; and
- providing optical signals between at least one of the plurality of ground-based, multi-channel, transmitting and receiving broadcasting grids and at least one of the plurality of low-altitude, optical transmitting and receiving satellites.

10. The communication method of claim 9 wherein said satellites are placed approximately 600 miles above the earth.

11. The communication method of claim 9 wherein said satellites transit an earth based grid in approximately 8 minutes.

12. The communication method of claim 9 wherein each satellite communicates with another satellite to provide communication between users over significant earth distances.

13. The communication method of claim 9 including achieving communication between users via plural grids and plural satellites.

14. The communication method of claim 9 wherein said satellites are rigid satellites.

15. The communication method of claim 9 wherein said satellites have no large moving parts.

16. A spinning satellite space-segment communication system comprising:
- a constellation of small, low-earth-orbit (LEO), spin-stabilized satellites for providing a world-wide, wide-bandwidth, internet-type function system, each spinning satellite of the constellation comprising:
- laser optical means for communicating with a complementary earth-based ground internet segment;
- means for inertial spin stabilization;
- means for attitude determination; and
- means for magnetic-loop control.

17. The system of claim 16 further including means for providing guidance, navigation and control in earth coordinates, with counter-rotating, inertial-stabilized pointing/tracking, bore-sighted downlinks/uplinks, and compensation for atmospheric turbulence effects.

18. The system of claim 16 wherein the characteristic internet-type function system includes very low latency, wide optical bandwidths, optical routing around satellite constellation, and optical atmospheric turbulence compensation.

19. The system of claim 16 wherein said satellites are rigid satellites.

20. The system of claim 16 wherein have no large moving parts.

* * * * *